US010539233B2

(12) United States Patent  
Yamada

(10) Patent No.: US 10,539,233 B2  
(45) Date of Patent: Jan. 21, 2020

(54) SHIFT RANGE CONTROLLER

(71) Applicant: DENSO CORPORATION, Kariya, Aichi-pref. (JP)

(72) Inventor: Jun Yamada, Kariya (JP)

(73) Assignee: DENSO CORPORATION, Kariya (JP)

(*) Notice: Subject to any disclaimer, the term of this patent is extended or adjusted under 35 U.S.C. 154(b) by 18 days.

(21) Appl. No.: 15/919,438

(22) Filed: Mar. 13, 2018

(65) Prior Publication Data

US 2018/0283545 A1 Oct. 4, 2018

(30) Foreign Application Priority Data

Mar. 28, 2017 (JP) .................................. 2017-62772

(51) Int. Cl.

| F16H 61/32 | (2006.01) |
| H02P 25/092 | (2016.01) |
| F16H 61/24 | (2006.01) |
| F16H 61/12 | (2010.01) |
| F16H 63/38 | (2006.01) |
| F16H 61/00 | (2006.01) |
| H02K 11/215 | (2016.01) |

(52) U.S. Cl.
CPC ............. *F16H 61/32* (2013.01); *F16H 61/12* (2013.01); *F16H 61/24* (2013.01); *F16H 63/38* (2013.01); *H02P 25/092* (2016.02); *F16H 2061/0053* (2013.01); *F16H 2061/247* (2013.01); *F16H 2061/326* (2013.01); *H02K 11/215* (2016.01)

(58) Field of Classification Search
CPC .................................................. F16H 2061/326
See application file for complete search history.

(56) References Cited

U.S. PATENT DOCUMENTS

| 5,117,710 A * | 6/1992 | Asano ..................... F16H 59/08 74/336 R |
| 7,005,814 B2 * | 2/2006 | Nakai ....................... H02P 6/24 318/400.28 |
| 7,382,107 B2 * | 6/2008 | Hori ........................ F16H 61/32 318/432 |
| 9,847,746 B2 * | 12/2017 | Yoshida .................. H02P 23/20 |
| 2003/0222617 A1 | 12/2003 | Nakai et al. |
| 2005/0151492 A1 * | 7/2005 | Nakai ..................... F16H 61/32 318/432 |
| 2006/0033464 A1 | 2/2006 | Nakai et al. |
| 2006/0197489 A1 | 9/2006 | Nakai et al. |
| 2007/0182353 A1 | 8/2007 | Kamio et al. |
| 2009/0193923 A1 | 8/2009 | Nakai et al. |
| 2011/0068730 A1 | 3/2011 | Nakai et al. |
| 2017/0307073 A1 | 10/2017 | Yamada |

* cited by examiner

*Primary Examiner* — Tisha D Lewis

(74) *Attorney, Agent, or Firm* — Nixon & Vanderhye P.C.

(57) ABSTRACT

A shift range controller includes a target speed setter that sets a target motor speed for a motor based on an angle deviation between a current rotation position of the motor and a target rotation position based on a requested shift range. A requested duty calculator calculates a requested duty as a drive control amount for driving the motor based on the target motor speed. The target speed setter receives a feedback of the requested duty, and changes the target motor speed at a deceleration time based on the feedback of the requested duty. By changing the target motor speed based on the requested duty, the target motor speed is optimized for responding to impediment-causing factors such as temperature and friction. In such manner, the shift range switching responsiveness is improved.

2 Claims, 8 Drawing Sheets

FIG. 7

| Vb | kVB1 | kVB2 | kVB3 | kVB4 |
|---|---|---|---|---|
| DECEL. START COUNT C1 | 80 | 70 | 60 | 50 |
| SPEED CHANGE COUNT C2 | 50 | 45 | 40 | 35 |
| STOP COUNT C3 | 2 | 2 | 2 | 2 |

FIG. 8

| Vb | kVB1 | kVB2 | kVB3 | kVB4 |
|---|---|---|---|---|
| Msp_hi | 3000 | 3500 | 4000 | 4500 |
| Msp_mid | 1500 | 1750 | 2000 | 2250 |
| Msp_lo | 850 | 900 | 950 | 1000 |

FIG. 10

| $|\Delta Cen|$ | $> TH1$ | $TH2 < |\Delta Cen| \leq TH1$ | $\leq TH2$ |
|---|---|---|---|
| DECEL. TIME TARGET DUTY [%] | 100 | −70 | −90 |

SHIFT RANGE CONTROLLER

CROSS REFERENCE TO RELATED APPLICATION

The present application is based on and claims the benefit of priority of Japanese Patent Application No. 2017-062772, filed on Mar. 28, 2017, the disclosure of which is incorporated herein by reference.

TECHNICAL FIELD

The present disclosure generally relates to a shift range controller.

BACKGROUND INFORMATION

A shift range switcher that controls a motor for shifting the ranges in an automatic transmission based on a driver's positioning of a shift range switch, i.e., to change a shift range, is disclosed in patent document 1, i.e., Japanese Patent Document No. 2004-23931. The shift range switcher in patent document 1 sets a phase advance correction amount that is suitable for a current rotation speed of the motor based on a deviation between a current rotation position and a target rotation position of the motor. In such manner, the switcher realizes a preset rotation speed that conforms to the deviation between the current rotation position and the target rotation position.

In patent document 1, the rotation speed of the motor needs to be set, or configured, to a value that operates the motor with a minimum torque generation capacity or with a minimum torque transfer capacity, as a result of impediment causing conditions. The impediment causing conditions may be caused by external factors that may or may not be directly detectable, such as, for example, extreme temperatures, temperature variations, and increased friction. Consequently, in a normal operating state of the motor, the torque generated by the motor or the torque generation capability of the motor, may be underutilized.

SUMMARY

It is an object of the present disclosure to provide a shift range controller with a motor that is appropriately controlled to have an improved responsiveness.

In an aspect of the present disclosure, the shift range controller is used for shift range switching by controlling a drive of a motor, and may include a target speed setter and an instruction calculator. The target speed setter may set a target rotation speed of the motor based on an angle deviation between a current rotation position of the motor and a target rotation position of the motor, based on a requested shift range. The instruction calculator may calculate a drive control amount for the drive of the motor, based on the target rotation speed.

The target speed setter may receive a feedback value of the drive control amount, and change the target rotation speed for a deceleration time based on the feedback value drive control amount. The target rotation speed may be configured to change based on the drive control amount. In such manner, the target rotation speed may be set to have an appropriate and optimum value in view of impediment causing conditions and external factors. The responsiveness of the shift range switching by the shift range controller from one shift range to the other may be improved.

BRIEF DESCRIPTION OF THE DRAWINGS

Objects, features, and advantages of the present disclosure will become more apparent from the following detailed description made with reference to the accompanying drawings, in which:

FIG. 7 is a table illustrating a deceleration start count, a speed change count, and a stop count;

FIG. 8 is a table illustrating the target motor speed based on the deceleration start count, the speed change count, and the stop count of FIG. 7;

FIG. 10 is a table illustrating a deceleration time target duty setting; and

DETAILED DESCRIPTION

An exemplary embodiment of a shift range controller is described based on FIGS. 1-11.

Figure 1:
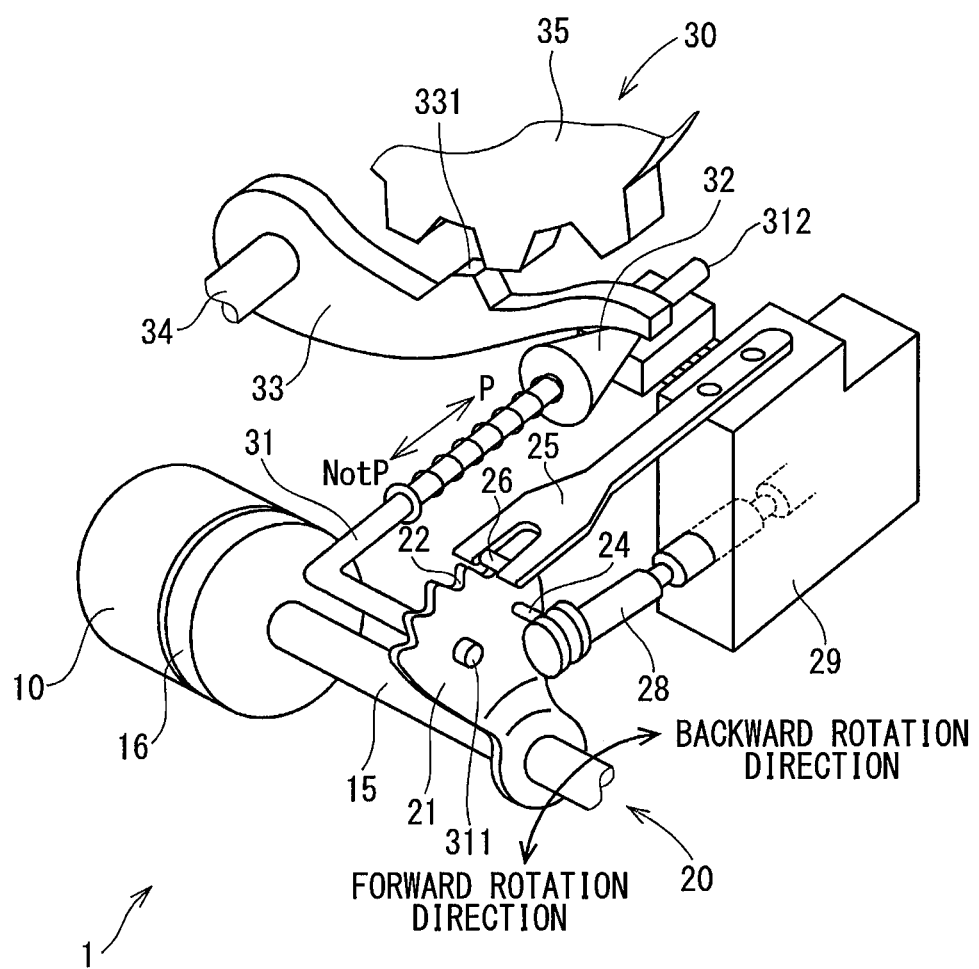
FIG. 1 illustrates a perspective view of a shift-by-wire system.
Figure 2:
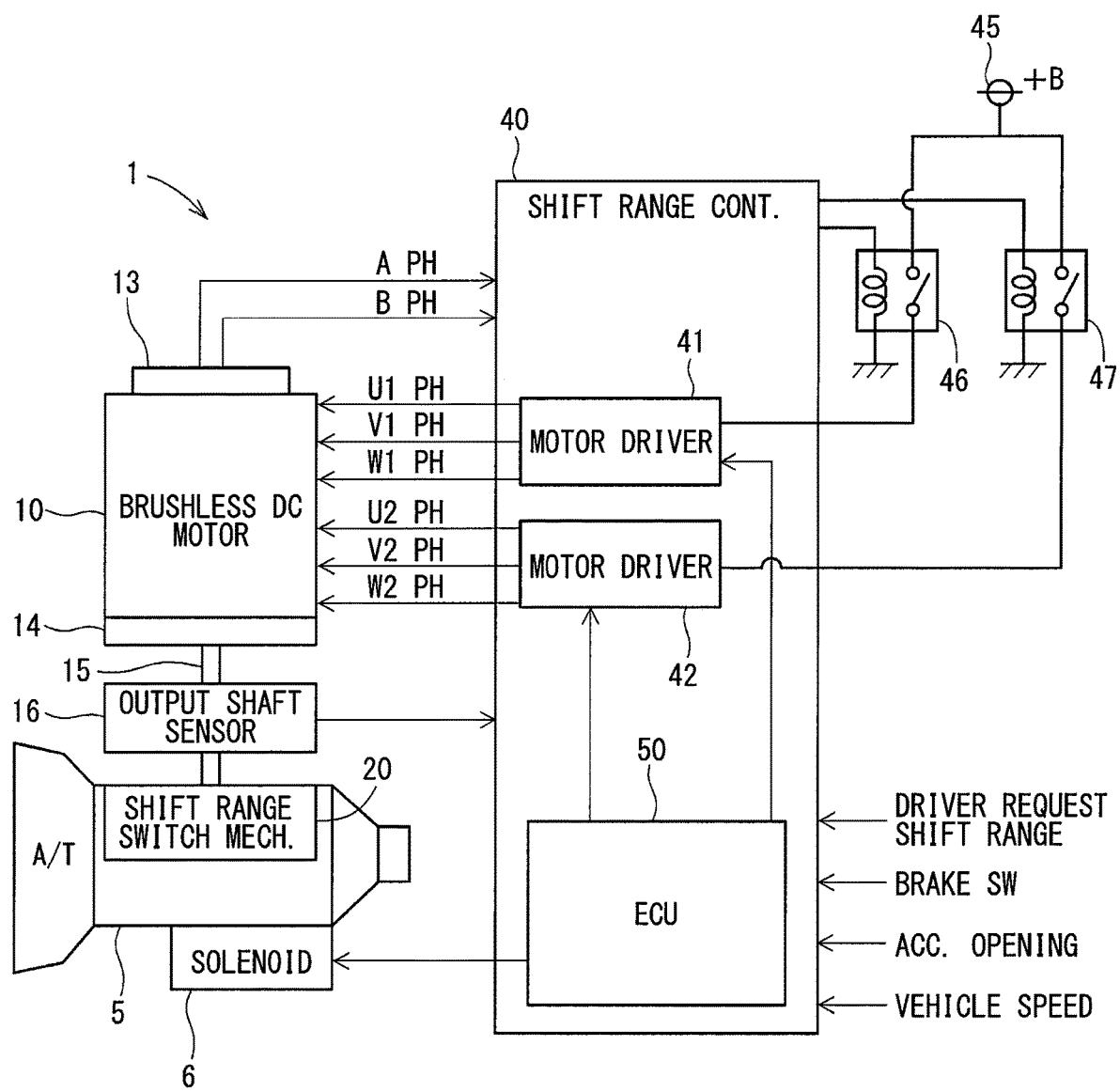
FIG. 2 illustrates a block diagram of the shift-by-wire system.

As shown in FIGS. 1 and 2, a shift-by-wire system 1 may include a motor 10, a shift range switch mechanism 20, a park lock mechanism 30, a shift range controller 40, and other elements.

Figure 3:
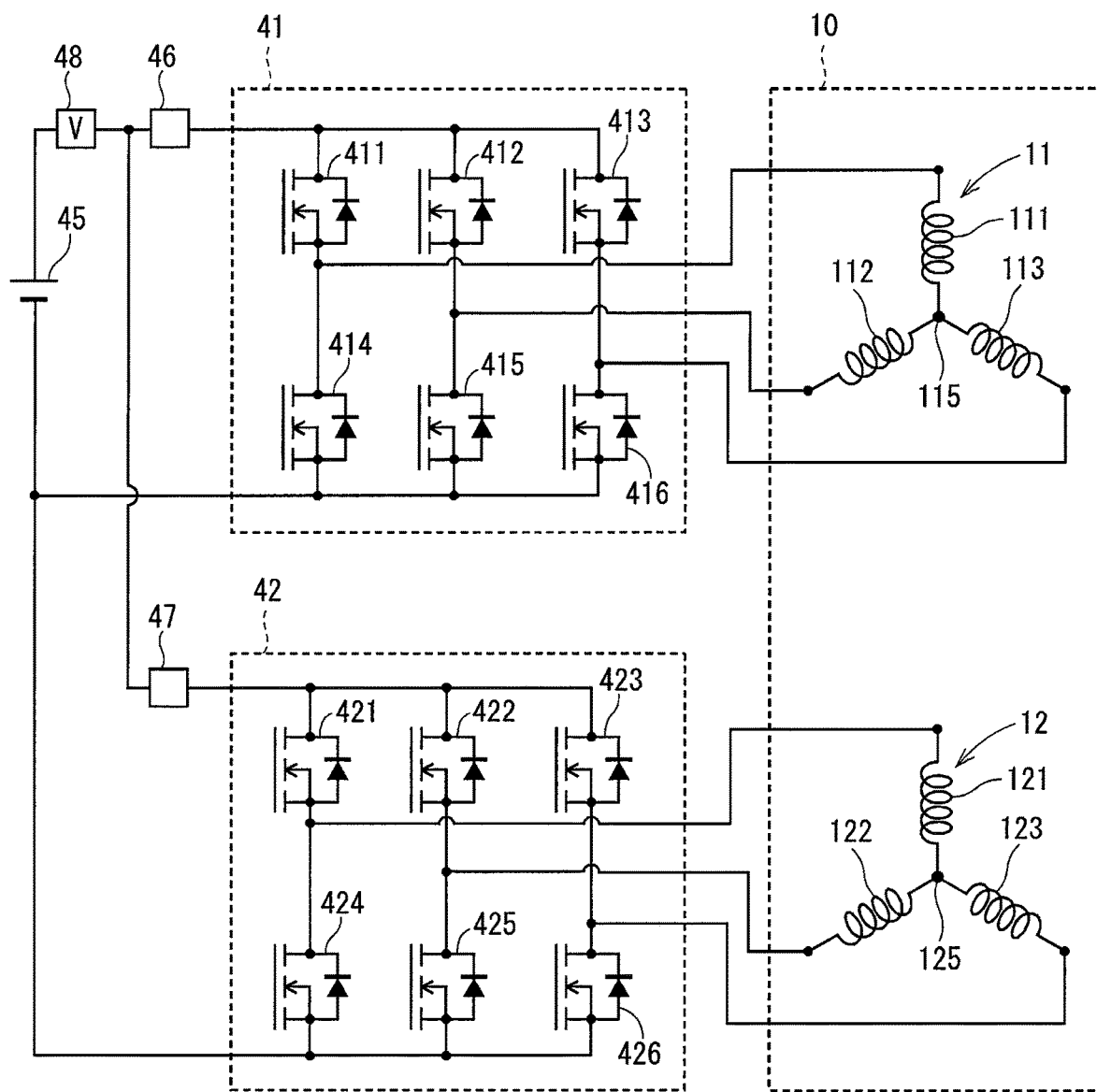
FIG. 3 illustrates a circuit diagram of a motor and a motor driver.

The motor 10 rotates by electric power supplied from a battery 45 (as shown in FIG. 3) carried in a vehicle (not illustrated), and is used as the driving power source for the shift range switch mechanism 20. By performing feedback control, the motor 10 may receive a variable magnitude of electric current, and the calculated values (i.e., instructions) for controlling the motor 10 may also change for each of the various phases. The motor 10 may be a permanent magnet-type DC brushless motor. As shown in FIG. 3, the motor 10 may have 2 sets of winding groups 11 and 12. The first winding group 11 has a U1 coil 111, a V1 coil 112, and a W1 coil 113. The second winding group 12 has a U2 coil 121, a V2 coil 122, and a W2 coil 123.

As shown in FIG. 2, an encoder 13 detects a rotation position of a rotor (not shown) in the motor 10. The encoder 13 may be a magnetic-type rotary encoder with a magnet that rotates with the rotor, a Hall IC sensor for magnetic detection, and the like. The encoder 13 outputs a pulse signal of an A phase and a pulse signal of a B phase at a predetermined angle in synchronization with the rotation of the rotor.

A decelerator or a speed reducer 14 is disposed at a position between a motor shaft (not shown) of the motor 10 and an output shaft 15. The decelerator 14 slows down a rotation speed of the motor shaft of the motor 10, and outputs the rotation to the output shaft 15. In such manner, the rotation of the motor 10 is transmitted to the shift range switch mechanism 20. The output shaft 15 has an output-shaft sensor 16 that detects an angle of rotation of the output shaft 15. The output-shaft sensor 16 may be, for example, a voltage divider.

As shown in FIG. 1, the shift range switch mechanism 20 may have a detent plate 21, a detent spring 25, and other components. The shift range mechanism 20 transmits the rotational driving force output from the decelerator 14 to a manual valve 28 and the park lock mechanism 30.

The detent plate 21 may be fixedly attached to the output shaft 15 and driven, i.e. rotated, via the output shaft 15 by the motor 10. When the detent plate 21 rotates away from a base of the detent spring 25, it is defined as a forward rotation direction, as shown in FIG. 1, and when the detent plate 21 rotates toward the base of the detent spring 25, it is defined as a backward rotation direction.

The detent plate 21 has a pin 24 that projects from the detent plate in a direction parallel to the output shaft 15. The pin 24 is connected with the manual valve 28. When the detent plate 21 is driven by the motor 10, the pin 24 acting on the manual valve 28 may cause the reciprocal movement of the manual valve 28 in an axial direction, i.e., in a direction along the longitudinal axis of the manual valve 28. That is, the shift range switch mechanism 20 converts a rotational movement of the motor 10 into a translational, linear movement, and uses such movement to move the manual valve 28. The manual valve 28 is formed on a valve body 29. The manual valve 28 moves reciprocally along the axial direction to actuate a hydraulic supply line to a hydraulic clutch (not illustrated) to control the engagement state of the hydraulic clutch switches, to change the shift ranges.

As shown in FIG. 1, the detent plate 21 may be partially cogged/toothed and may include four concave indentations 22 between the cogs/teeth for holding the manual valve 28 in positions corresponding to each of the shift ranges. That is, the teeth and concave indentations may be provided on one side of the detent plate 21 closest to the detent spring 25. The four concave indentations 22 may correspond to the shift ranges of D, N, R, and P. For example, as shown in FIG. 1, the concave indentation 22 closest to the detent spring 25 may correspond to the D range and the concave indentation 22 furthest from the detent spring 25 may correspond to the P range.

The detent spring 25 is a planar member that may be elastically deformable. As shown in FIG. 1, the detent spring 25 may have one end fixedly attached to a base element, i.e., the valve body 29, and have another end with a detent roller 26 disposed at the tip. The detent spring 25 biases the detent roller 26 toward the rotational center of the detent plate 21. When a torque having more than a predetermined magnitude is applied to the detent plate 21, the detent plate 21 rotates, the detent spring 25 is elastically deformed, and the detent roller 26 moves between the concave indentations 22. When the detent roller 26 meshes or engages with the concave indentations 22, the rotational motion of the detent plate 21 is regulated, the axial position of the manual valve 28 is fixed, the state of the park lock mechanism 30 is determined, and the shift range of an automatic transmission 5 is set.

The park lock mechanism 30 has a park rod 31, a cone 32, a park lock pole 33, a shaft 34, and a park gear 35.

The park rod 31 may be formed in an "L" shape with one end 311 fixed to the detent plate 21, as shown in FIG. 1. The cone 32 may be disposed near another end 312 of the park rod 31. A radius/diameter of the cone 32 may decrease in the direction of the other end 312. When the detent plate 21 rotates in the backward rotation direction, the cone 32 moves in the P arrow direction, as shown in FIG. 1.

The park lock pole 33 contacts a surface of the cone 32 and rotates about the shaft 34. A convex, tooth-shaped projection 331 is disposed on a surface of the park lock pole 33 closest to the park gear 35. The convex, tooth-shaped projection 331 may engage with the park gear 35 to limit the rotation of the park gear 35 and lock the transmission. When the detent plate 21 rotates in the backward rotation direction and the cone 32 moves in the P arrow direction, the cone 32 may urge the park lock pole 33 upward so that the convex projection 331 engages the park gear 35 to lock the transmission. For example, the transmission may be locked when the detent plate 21 is rotated backward so that the detent roller 26 engages the concave indentation 22 corresponding to the P range. When the detent plate 21 rotates in the forward rotation direction and the cone 32 moves in a NotP arrow direction, as shown in FIG. 1, the park lock pole 33 contacts the cone 32 at a region with a smaller diameter and rotates, or falls away from the park gear 35 to disengage the convex projection 331 from the park gear 35 to unlock the transmission. For example, the transmission may be unlocked when the detent plate 21 is rotated forward so that the detent roller 26 disengages from the concave indentation 22 corresponding to the P range.

The park gear 35 is disposed on an axle (not illustrated) and is engageable with the convex projection 331 of the park lock pole 33. When the convex projection 331 engages with the park gear 35, the rotation of the axle is regulated. When the shift range is a NotP range, i.e., a shift range other than a P range, the park gear 35 is not locked by the park lock pole 33, and the rotation of the axle is not prevented by the park lock mechanism 30. When the shift range is the P range, the park gear 35 is locked by the park lock pole 33, and the rotation of the axle is regulated.

As shown in FIG. 2, the shift range controller 40 has motor drivers 41 and 42 and an ECU 50.

Figure 4:
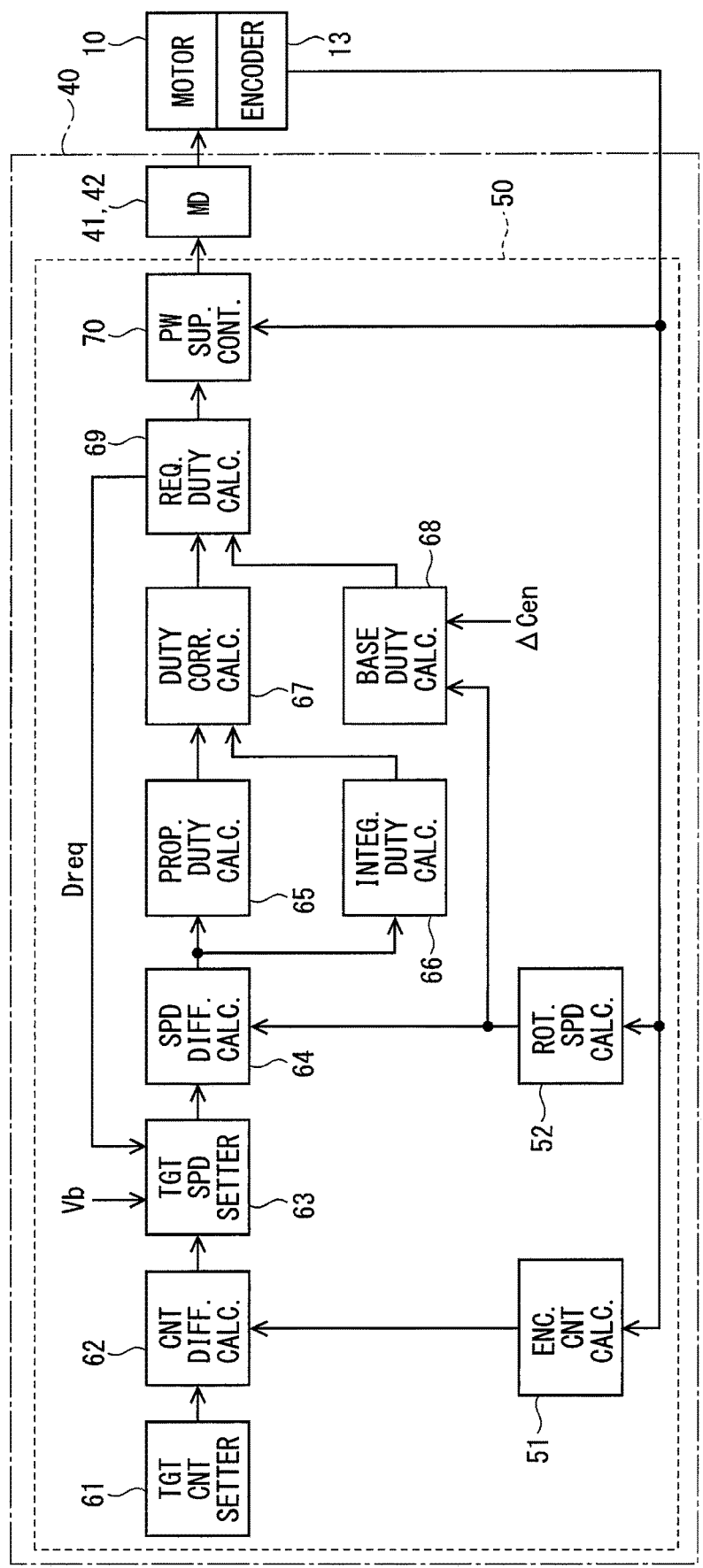
FIG. 4 illustrates a block diagram of a shift range controller.

With reference to FIG. 4, the motor driver 41 may be a three-phase inverter that switches a power supply of the first winding group 11. The motor driver 41 may be a bridge connection of switching elements 411, 412, 413, 414, 415, and 416. An end of a U1 coil 111 is connected to a junction point between a pair of the switching elements 411 and 414 for the U phase. An end of a V1 coil 112 is connected to a junction point between a pair of the switching elements 412 and 415 for the V phase. An end of a W1 coil 113 is connected to a junction point between a pair of the switching elements 413 and 416 for the W phase. The other ends of the coils 111, 112, and 113 may be connected to a connection 115 and arranged in a wye-shaped connection.

The motor driver 42 may be a three-phase inverter that switches a power supply of the second winding group 12. The motor driver 42 may be provided as a bridge connection of switching elements 421, 422, 423, 424, 425, and 426. An end of a U2 coil 121 is connected to a junction point between a pair of the switching elements 421 and 424 for the U phase. An end of a V2 coil 122 is connected to a junction point between a pair of the switching elements 422 and 425 for the V phase. An end of a W2 coil 123 is connected to a junction point between a pair of the switching elements 423 and 426 for the W phase. The other ends of the coils 121, 122, and 123 may be connected to a connection 125 and arranged in a wye-shaped connection.

The switching elements 411-416 and 421-426 may be implemented as MOSFETs, or as other switching elements such as IGBTs and the like.

With reference to FIGS. 2 and 3, a motor relay 46 may be disposed at a position between the motor driver 41 and the battery 45. A motor relay 47 may be disposed at a position between the motor driver 42 and the battery 45. The motor relays 46 and 47 are turned ON when a start switch (not shown), for example an ignition switch, is turned ON and electric power is supplied to the motor 10. The motor relays 46 and 47 are turned OFF when the start switch is turned OFF and the supply of electric power to the motor 10 is interrupted.

With reference to FIG. 3, a voltage sensor 48 that detects a battery voltage V is disposed on a high potential side of the battery 45.

An electric current sensor (not shown) that detects a motor current Im is provided in the shift range controller 40.

The ECU 50 controls the drive of the motor 10, by controlling an ON-OFF operation of the switching elements 411-416 and 421-426. The ECU 50 controls the drive of a hydraulic solenoid valve 6 to change gears based on a vehicle speed, an accelerator opening, a driver-requested shift range, and the like. A gear of the automatic transmission 5 is controlled by controlling the hydraulic solenoid valve 6 for changing gears. The number of the hydraulic solenoid valves 6 may be based on the number of the gears. Although one ECU 50 is provided to control the drive of both of the motor 10 and the solenoid valve 6, separate ECUs such as a motor ECU for control of the motor 10, and an AT-ECU for solenoid control may be used.

As shown in FIG. 4, the ECU 50 may include an encoder count calculator 51, a rotation speed calculator 52, a target count setter 61, a count difference calculator 62, a target speed setter 63, a speed difference calculator 64, a proportional duty calculator 65, an integral duty calculator 66, a duty correction amount calculator 67, a base duty calculator 68, a request duty calculator 69, and a power supply controller 70. The request duty calculator 69 may also be referred to herein as an "instruction calculator." A microcomputer or like processor may be used as the main component of the ECU 50. The processing performed by each of the components in the ECU 50 may be performed by software executing a program stored on a substantive storage device, such as a ROM, by using a CPU. Alternatively, the components of the ECU 50 may be hardware, for example an IC or application specific IC (ASIC), and used to perform the processing by using a dedicated electronic circuit.

The encoder count calculator 51 calculates an actual count value "Cen" that is a count value of the encoder 13 based on a pulse of an A phase and a pulse of a B phase that are output from the encoder 13. The actual count value Cen is a value based on an actual mechanical angle and an electrical angle of the motor 10. That is, a "count" or "count value" may correspond to the angular position of motor 10.

The rotation speed calculator 52 calculates a motor speed "Msp" that is a rotation speed of the motor 10 based on the pulse of the A phase and the pulse of the B phase that are output from the encoder 13.

The target count setter 61 sets a target count value "Cen*" based on a driver-requested shift range as input from the operation of a shift lever or like control mechanism (not illustrated).

The count difference calculator 62 calculates a count deviation "ΔCen" that is a difference between the target count value Cen* and the actual count value Cen, as shown in equation (1). The count deviation ΔCen may be considered as the remaining number of counts to a target position. The count deviation ΔCen may also be referred to herein as an "angle deviation."

$$\Delta Cen = Cen^* - Cen \qquad \text{Equation (1)}$$

The target speed setter 63 calculates a target motor speed "Msp*" that is a target speed of the motor 10 based on the count deviation ΔCen. The target speed setter 63 is also configured to read, determine, calculate, set, and correct count values.

The speed difference calculator 64 calculates a speed difference "ΔMsp" that is a difference between the target motor speed Msp* and the motor speed Msp, as shown in equation (2). The target motor speed Msp* may also be referred to herein as "the target rotation speed Msp*."

$$\Delta Msp = Msp^* - Msp \qquad \text{Equation (2)}$$

The proportional duty calculator 65 calculates a duty proportional term "Dp" by multiplying the speed difference ΔMsp by a proportional gain.

The integral duty calculator 66 calculates a duty integral term "Di" based on the speed difference ΔMsp.

The duty correction amount calculator 67 calculates a duty correction amount "Dfb" by adding the duty proportional term Dp to the duty integral term Di, as shown in equation (3).

$$Dfb = Di + Dp \qquad \text{Equation (3)}$$

The base duty calculator 68 calculates a base duty "Dbs" that may be based on the motor speed Msp, the count deviation ΔCen, and other values.

The requested duty calculator 69 calculates a requested duty "Dreq" by adding the base duty Dbs and the duty correction amount Dfb, as shown in equation (4). The calculated requested duty Dreq is corrected by a battery voltage "Vb" and output to the power supply controller 70. The post-correction requested duty Dreq may be fed back (i.e., used as a feedback value) to the target speed setter 63. Hereafter, the value after the correction by the battery voltage Vb may be designated simply as "the requested duty Dreq." The requested duty Dreq may also be referred to herein as a "drive control amount."

$$Dreq = Dbs + Dfb \qquad \text{Equation (4)}$$

The power supply controller 70 generates a control signal that controls an ON-OFF operation of the switching elements 411-416 and 421-426 based on the pulse of the A phase and the pulse of the B phase output from the encoder 13 and the requested duty Dreq. The generated control signal is output to the motor drivers 41 and 42.

For the feedback control of the present example, the size of the electric current flowing into the coils 111-113 and 121-123 and the torque can be changed by changing the duty, for example, by PWM control.

The drive of the motor 10 may be controlled by a 120-degree power supply control. In the 120-degree power supply control, a switching element on a high potential side of the first phase and a switching element on a low potential side of the second phase are turned ON. By switching a combination of the first phase and the second phase for every 60 degrees of electrical angle, the power supply phase is switched. By switching in such manner, a rotating magnetic field is generated in the winding groups 11 and 12, and the motor 10 rotates.

A duty with a positive value is used to output a positive torque for rotating the motor 10 in a direction based on the requested shift range, and a duty with a negative value is used for braking. The duty range may spread from −100% to +100%.

Figure 5:
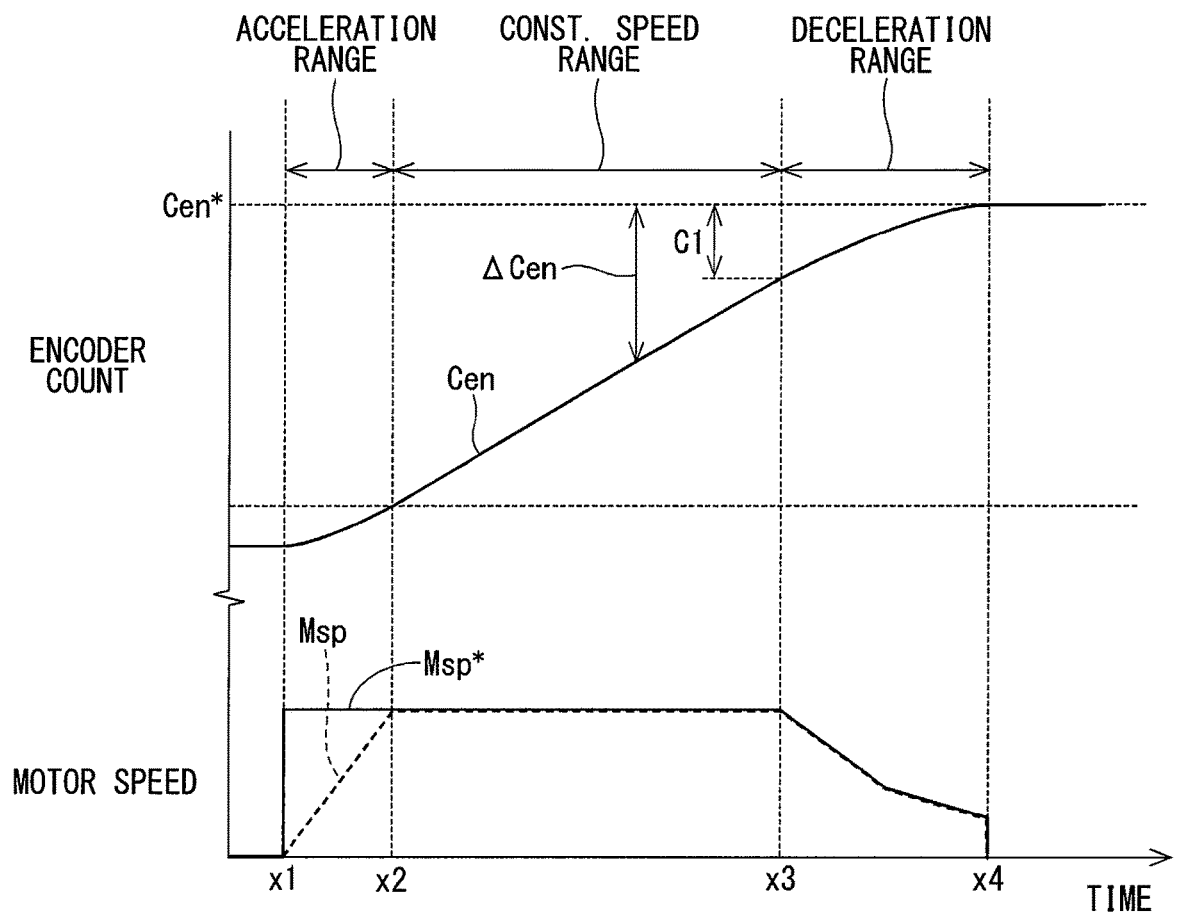
FIG. 5 is a diagram illustrating a motor speed change.

The change of the motor speed Msp accompanying the rotation of the motor 10 is shown in the diagram of FIG. 5. In FIG. 5, a horizontal axis is set as a common time-axis, the actual count value Cen is shown in an upper part of the diagram, and the motor speed Msp is shown in a lower part of the diagram.

When a shift range changes at time x1 based on a user request, the target count value Cen* is set based on the requested shift range. The target motor speed Msp* is set according to the count deviation ΔCen.

In the period up to time x2, i.e., between x1 and x2, the motor speed Msp increases to reach the target motor speed Msp*. This period is defined as an acceleration range and the motor 10 is accelerated during such range.

A period from time x2 to time x3, during which the motor 10 is driven at a constant speed, is defined as a constant speed range and the motor 10 is driven/rotated toward the target position.

At time x3, i.e., when the actual count value Cen approaches the target count value Cen* and the count deviation ΔCen decreases to a deceleration start count value C1, the speed of the motor 10 is decreased so that the motor stops appropriately at the target position. The time period beginning at time x3 and corresponding to the deceleration count value C1, and continuing thereafter, may be designated as the deceleration range. The period of time beginning at time x3 may be designated as the deceleration start timing or more simply as the deceleration time. That is, count value C1 may be used to indicate the beginning of the deceleration time at time x3. At time x4 when the actual count value Cen comes into a control range that includes the target count value Cen*, by supplying power to a fixed phase based on an actual count value, the motor 10 may be stopped whereby the motor speed Msp decreases to zero.

The target motor speed Msp* in the deceleration range takes impediment causing conditions and external factors into account that may not be directly detectable, such as temperature and friction, to stop the motor 10 at the target position. To account for these impediment causing conditions, i.e., worst-case scenario conditions, the motor 10 may be designed to generate and output very little torque and use a corresponding target motor speed Msp* as it enters a deceleration state and approaches a target count value Cen*. That is, the motor 10 may be stopped at the target count value Cen* without any overshoot or undershoot even during impediment causing conditions where the motor 10 may generate and transmit very little torque. In other words, even when the motor 10 is operated during the impediment causing condition, i.e., in a state where minimum torque generated/transmitted, the target motor speed Msp* enables the motor 10 to rotate to end stop at the target position.

Setting the target motor speed Msp* in such manner includes a margin for (i.e., room for) improved responsiveness. That is, in the deceleration range of a normal operation state, the motor 10 operates, i.e., rotates, without fully using the maximum torque that may be output. In other words, based on the previously described design considerations for worst-case scenario conditions, a motor 10 operating in normal operating conditions may have some margin of additional torque output capability that is not being utilized, which could be utilized to improve the responsiveness of the motor 10.

In view of such a margin, according to the present disclosure, the requested duty Dreq may be fed back to the target speed setter 63, and the target speed at the deceleration time may be updated based on the requested duty Dreq.

An initial value of a target speed parameter is described with reference to FIGS. 6-8. As used herein, the target speed parameter may also be designated as a "speed parameter."

Figure 6:
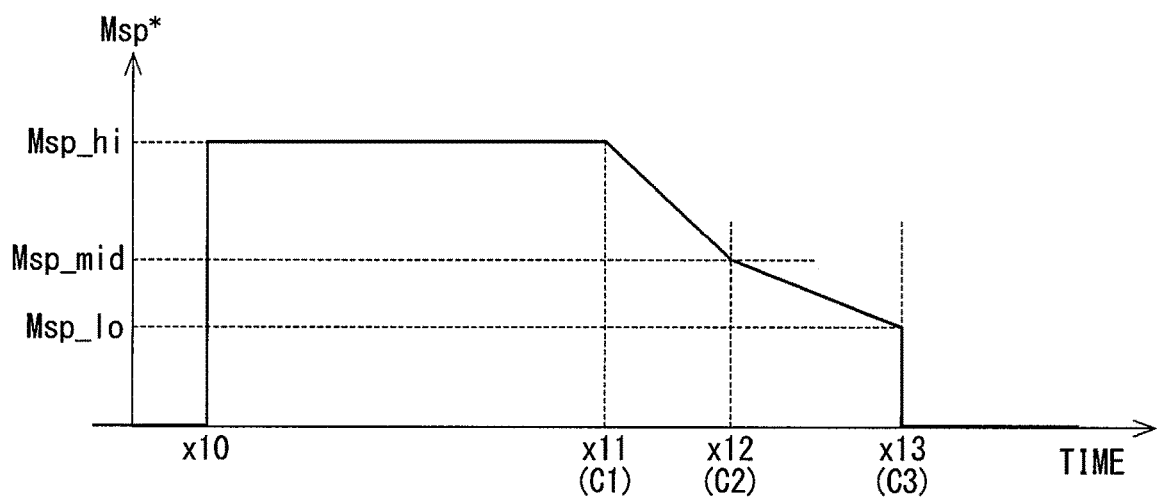
FIG. 6 is a diagram illustrating a setting of a target motor speed.

FIG. 6 is a time chart showing a change of the target motor speed Msp* when the requested shift range changes. Parenthesized numbers C1, C2, and C3 indicate the count deviation ΔCen at those timings. That is, the count deviation ΔCen at time x11, takes the deceleration start count value C1, takes a speed change count value C2 at time x12, and takes a stop count value C3 at time x13. The target speed setter 63 may determine the start times of each of the start count value C1, the speed change count value C2, and the stop count value C3.

As shown in FIG. 6, the target motor speed Msp* in the period from time x10 to time x11 shows a change in the requested shift range at time x10 up to a constant speed Msp_hi that continues to time x11 when the count deviation ΔCen reaches the deceleration start count value C1.

In a period from time x11 to time x12, the target motor speed Msp* is set by interpolation and/or estimation such that the target motor speed Msp* at a time when the count deviation ΔCen is equal to the deceleration start count value C1 is the constant speed Msp_hi and the target motor speed Msp* at a time when the count deviation ΔCen is equal to the speed change count value C2 is a mid-deceleration speed Msp_mid.

In a period from time x12 to time x13, the target motor speed Msp* is set by estimation, i.e., interpolation. That is, at time x12 when the count deviation ΔCen is equal to the speed change count value C2, the target motor speed Msp* is a mid-deceleration speed Msp_mid, and at time x13 when the count deviation ΔCen is equal to the stop count value C3, the target motor speed Msp* is a deceleration end speed Msp_lo.

In FIG. 7, a table shows the deceleration start count value C1, the speed change count value C2, and the stop count value C3 based on the battery voltage Vb. The battery voltage Vb is assumed as kVB1<kVB2<kVB3<kVB4. The deceleration start count value C1 and the speed change count value C2 are respectively set to a greater value when the battery voltage Vb decreases to a smaller value. The stop count value C3 takes the same value regardless of the battery voltage Vb.

In FIG. 8, the constant speed Msp_hi, the mid-deceleration speed Msp_mid, and the deceleration end speed Msp_lo, based on the battery voltages Vb, i.e., kVB1, kVB2, kVB3, and kVB4, are shown.

Assuming again that kVB1<kVB2<kVB3<kVB4, the constant speed degree Msp_hi, the mid-deceleration speed Msp_mid, and the deceleration end speed Msp_lo are respectively set to a greater value when the battery voltage Vb increases to a greater value.

As shown in FIGS. 6-8, the target motor speed Msp* may be calculated by interpolation or estimation based on the count deviation ΔCen and the battery voltage Vb. Here, by changing the deceleration start count value C1 using the target speed setter 63, the deceleration (i.e., rate of decrease of the target motor speed Msp*) will be changed, thereby changing the target motor speed Msp*. For example, when the target speed setter 63 changes the deceleration start count value C1 to a smaller value, the start time of the deceleration is delayed, a greater deceleration value may be used to achieve the target motor speed Msp*.

The values shown in FIGS. 7 and 8 are only examples, and may be arbitrarily changed. Changing the deceleration (i.e., changing the rate of decrease for the target motor speed Msp*) during the deceleration time using the target speed setter 63 to set the speed change count value C2 in the present exemplary embodiment may be omitted in other embodiments. The target speed setter 63 may employ a plurality of speed change counts to make stepwise changes to the deceleration.

Figure 9:
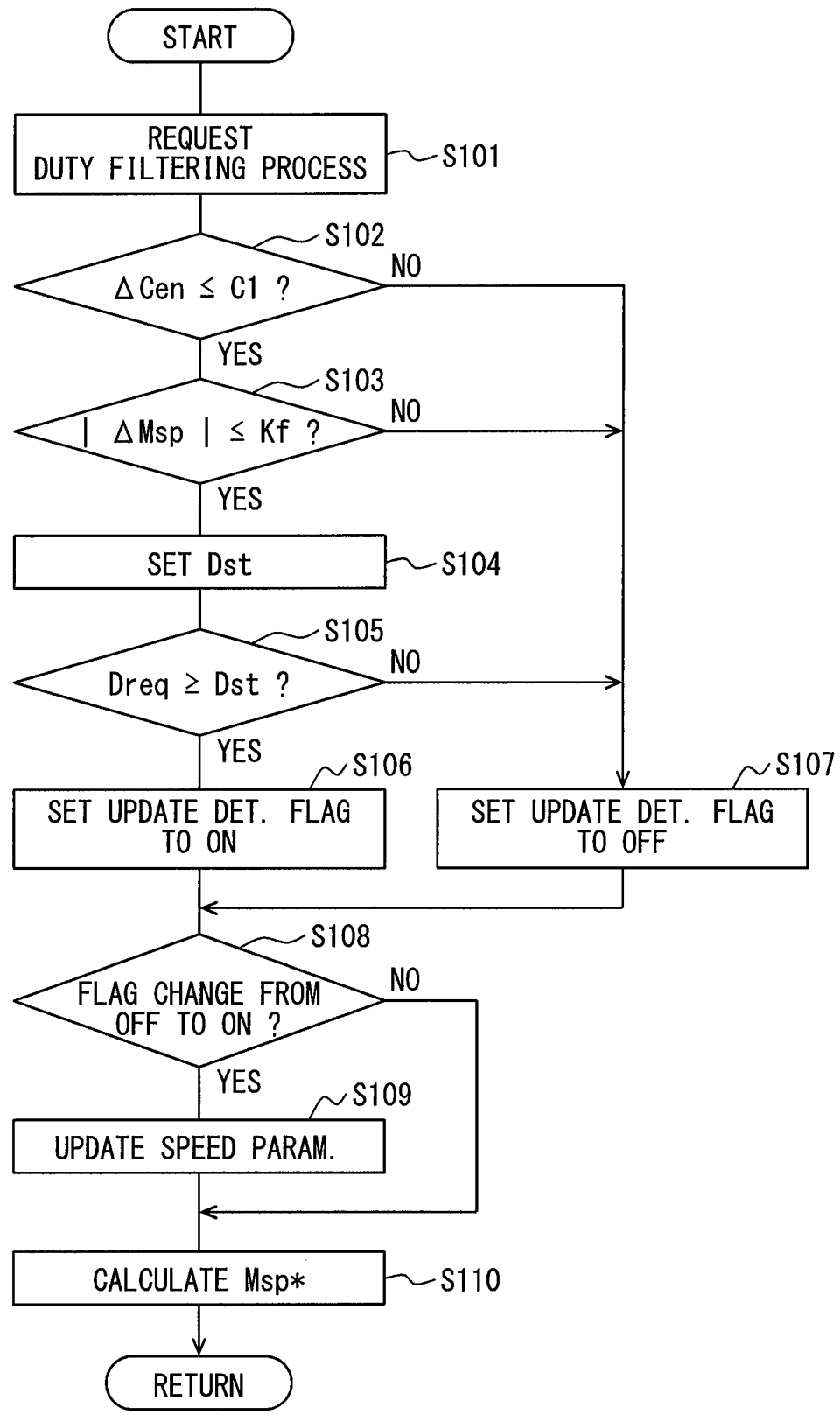
FIG. 9 is a flowchart of a target speed setting process.

With reference to the flowchart of FIG. 9, the target speed setting process is described. This process is performed at a predetermined cycle by the target speed setter 63.

At S101, the target speed setter 63 performs a filtering process of the requested duty Dreq that is fed back from the request duty calculator 69, with reference to equation (5).

The suffix "_$f_i$" is given to the current filtering value and the suffix "_$f_{i-1}$" is given to the previous filtering value in the equation. "K2" in the equation may be a predetermined constant, for example, 2.

$$Dreq\_f_i = Dreq\_f_{i-1} + (Dreq - Dreq\_f_{i-1})/K2 \quad \text{Equation (5)}$$

The value after the filtering process may be designated as the "requested duty Dreq."

At S102, the target speed setter 63 may detect the deceleration start count value C1. That is, at S102 the target speed setter 63 determines whether the count deviation ΔCen is less than or equal to the deceleration start count value C1. When it is determined that the count deviation ΔCen is greater than the deceleration start count value C1, i.e. NO at S102, the process shifts to S107. When it is determined that the count deviation ΔCen is less than the deceleration start count value C1, i.e. YES at S102, the process shifts to S103.

At S103, the target speed setter 63 determines whether an absolute value of the speed difference ΔMsp is equal to or less than a matching determination value Kf. The matching determination value Kf is set as a value where, when used to determine the motor speed Msp, the motor speed Msp substantially conforms to or matches the target motor speed Msp*. When it is determined that the absolute value of the speed difference ΔMsp is greater than the matching determination value Kf, i.e NO at S103, the motor speed Msp is determined to not match the target motor speed Msp*, and the process shifts to S107. That is, when the motor speed Msp does not match the target motor speed Msp*, a speed parameter update process is not performed. When the absolute value of the speed difference ΔMsp is determined to be equal to or less than the matching determination value Kf (S103: YES), the motor speed Msp is determined to conform to, converge toward, or match the target motor speed Msp*, and the process shifts to S104.

At S104, the target speed setter 63 sets a deceleration time target duty "Dst" based on the absolute value of the count deviation ΔCen. The deceleration time target duty Dst may be set based on the exemplary map/table shown in FIG. 10. The threshold values "TH1" and "TH2" for the count deviation ΔCen are set as TH1>TH2. The threshold TH1 is set to a value that corresponds to a time where the detent roller 26 of the detent spring 25 moves out of the concave indentations 22 on the detent plate 21 and toward the crest of cogs/teeth. In other words, TH1 corresponds to the time where the detent roller 26 crests one of the cogs/teeth of the detent plate 21. When the absolute value of the count deviation ΔCen is greater than the threshold TH1, this means that the detent roller 26 has not yet crested one of the cogs/teeth on the detent plate 21. That is, when determining the threshold value TH1, the deceleration time target duty Dst may be set to be a sufficiently large value such that a speed update process will not be performed. The deceleration time target duty Dst may be referred to herein as a "standard control amount."

Generally, detent torque is the torque exerted by the detent roller 26 of the detent spring 25 acting on the detent plate 21. As a result of the interconnection of components, this detent torque may also act on the output shaft 15, the motor shaft, and other interconnected components. When the absolute value of the count deviation ΔCen is greater than the threshold TH1, the torque, i.e., detent torque, caused by the detent roller 26 of the detent spring 25 acting on the detent plate 21 urges the motor shaft in a counter rotation direction, i.e., a reverse direction, of the rotation direction of the motor 10. When the absolute value of the count deviation ΔCen is smaller than the threshold TH1, the detent torque acting on the motor shaft 105 increases in the rotation direction of the motor 10.

That is, setting the deceleration time target duty Dst based on the count deviation ΔCen at the deceleration time means that the deceleration time target duty Dst is set based on the torque characteristic of the detent torque acting on the motor shaft.

At S105, the target speed setter 63 determines whether the request duty Dreq is equal to or greater than the deceleration time target duty Dst. When the requested duty Dreq is determined to be smaller than the deceleration time target duty Dst, i.e. NO at S105, the process shifts to S107. When the requested duty Dreq is determined to be equal to or greater than the deceleration time target duty Dst, i.e., YES at S105, the process shifts to S106.

At S106, the target speed setter 63 sets an update determination flag to ON.

At S107, the target speed setter 63 sets the update determination flag to OFF.

At S108, the target speed setter 63 determines whether the update determination flag has been changed from OFF to ON. When the update determination flag is determined to be OFF, i.e. NO at S108, the speed parameter update process is not performed, and the process shifts to S110. When the update determination flag is determined as having been changed from OFF to ON, i.e. YES at S108, the process shifts to S109.

At S109, the target speed setter 63 updates the speed parameter.

In the present embodiment, the speed parameter is updated by changing the deceleration start count value C1 and the speed change count value C2. A correction value "CV" for correcting the count values C1 and C2 is calculated by equation (6). "Kcv" in the equation is a preset constant and the correction value CV takes a value equal to or greater than 1, that is, CV≥1.

$$CV = (Dreq - Dst) \times Kcv + 1 \quad \text{Equation (6)}$$

The deceleration start count value and the speed change count value after the correction are represented by equations (7) and (8). In equations (7) and (8), the count values after the correction are respectively set to "C1a" and "C2a," and the initial values are respectively set to "C1in" and "C2in."

$$C1a = C1in/CV \quad \text{Equation (7)}$$

$$C2a = C2in/CV \quad \text{Equation (8)}$$

When an update of the speed parameter is complete, the update determination flag is reset.

At S110, the target speed setter 63 calculates the target motor speed Msp* based on the count deviation ΔCen. Although the parameters described in FIGS. 7 and 8 are used for calculating the target motor speed Msp*, when the count values C1 and C2 have been updated at S109, the values after such update, i.e. C1a and C2a, may be used.

Figure 11:
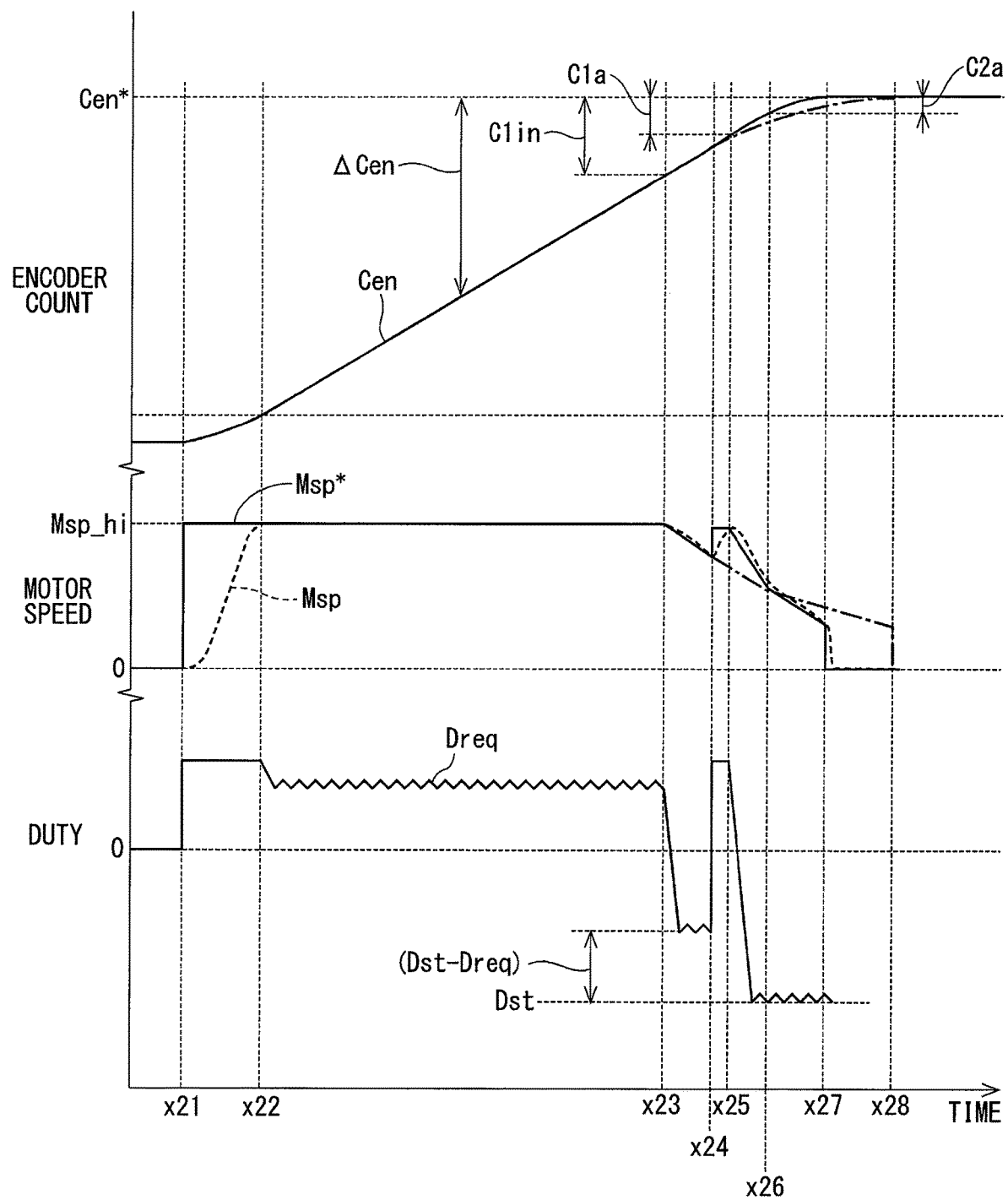
FIG. 11 is a time chart illustrating the target speed setting process.

An example of the target speed setting process is described based on the time chart illustrated in FIG. 11. The following exemplary description assumes that the motor 10 is rotated in the forward rotation direction to change the requested shift range from the P range to the D range.

In FIG. 11, a horizontal axis is set as a common time axis for an encoder count value, a motor speed, and a duty. As shown in FIG. 11, the encoder count value is shown near the top part, the motor speed is shown in the middle, and the duty is shown on the bottom. The actual count value Cen is represented by a solid line in instances where the speed parameter has been updated and represented by a one dot, long-dashed line in instances where the speed parameter has not been updated. As for the motor speed in the present embodiment, the motor speed Msp in instances where the speed parameter has been updated is represented by a solid line in the drawing and by a broken line in instances where the speed parameter has not been updated. The target motor speed Msp* is shown as a one dot, long-dashed line for instances where the speed parameter has not been updated. The duty is shown only for instances where the speed parameter has been updated. In FIG. 11, the requested duty Dreq is shown as a solid line. Duty values at certain times, i.e., the deceleration time target duty Dst, may also be indicated.

When the requested shift range changes from the P range to the D range at time x21, the target count value Cen* and the target motor speed Msp* are set, and the drive of the motor 10 is controlled by a feedback control. In FIG. 11, the period from time x21 to time x22 is the acceleration range and the period from time x22 to time x23 is the constant speed range.

When the count deviation ΔCen is equal to the initial value C1in of the deceleration start count value at time x23, the process shifts to a deceleration control.

In the example shown in FIG. 11, a control is performed to set the target motor speed Msp* based on the count deviation ΔCen and the battery voltage Vb during the period from time x23 to time x24. During the period from time x23 to time x24, the requested duty Dreq is greater than the deceleration time target duty Dst, though both the requested duty Dreq and the deceleration time target duty Dst are negative values at this time. In other words, the absolute value of the requested duty Dreq at the deceleration control time (i.e., time x23 to time x24) is smaller than the absolute value of the deceleration time target duty Dst.

In the deceleration range, a duty control state using a duty value that has a smaller absolute value than the deceleration time target duty Dst may be interpreted as a state in which a greater deceleration torque could be output by using a duty control with a duty value that is equal to the deceleration time target duty Dst. That is, a difference between the deceleration time target duty Dst and the requested duty Dreq may be interpreted as a degree of margin of deceleration control, and the duty control driving the motor 10 in the period between time x23 and time x24 is thus understood as a state where an additional output capacity of the motor 10 may be realized based on such margin.

Thus, in the present embodiment, when the requested duty Dreq is greater than the deceleration time target duty Dst and the output capacity of the motor 10 has some margin for deceleration control, the parameter for setting the target motor speed Msp* is updated.

More practically, when, at time x24, the difference between the target motor speed Msp* and the motor speed Msp is smaller than the matching determination value Kf, i.e., YES at S103 in FIG. 9, and the requested duty Dreq is equal to or greater than the deceleration time target duty Dst, i.e., YES at S105 in FIG. 9, the deceleration start count value C1 is updated. That is, the deceleration start count value C1 is corrected by the correction value CV, and the initial value C1in is changed to the after-correction deceleration start count value C1a. At time x24, since the count deviation ΔCen is greater than the after-correction deceleration start count value C1a, the deceleration control is once interrupted, and the motor speed returns to control with a speed in the constant speed range, i.e. Msp_hi.

Then, at time x25, when the count deviation ΔCen is equal to the after-correction deceleration start count value C1a, the deceleration control is resumed, that is, the deceleration control begins again at time x25. As compared to instances where the deceleration control is continued from time x23 without interruption, the count deviation ΔCen in this case, i.e., where deceleration control is started at time x23, interrupted at time x24, and resumed at time x25, is smaller. That is, in instances where deceleration control is started and interrupted, the deceleration count value is corrected, and deceleration control is resumed, the remaining counts until reaching the target count value Cen* will be less than if deceleration control were to continue without any interruption and value correction. Therefore, when the interpolation calculation of the target motor speed Msp* is performed as described in FIGS. 6-8, the deceleration, that is, the rate of decrease of the target motor speed Msp*, becomes greater.

When the count deviation ΔCen is the after-correction speed change count value C2a at time x26, the deceleration changes.

For the example described in view of FIG. 11, the requested duty Dreq becomes (i.e., decreases in value towards) the deceleration time target duty Dst during the deceleration control starting at time x25. However, such a control may be modified, i.e., the speed parameter update process may be repeated, or performed once again, when the requested duty Dreq at time x25, i.e., when performing the deceleration control at time x25, is greater than the deceleration time target duty Dst.

If no speed parameter update process is performed, the motor 10 arrives at the target position at time x28, i.e. Cen*. On the other hand, when the output capacity of the motor 10 includes some margin for additional deceleration control, the deceleration start timing may be delayed by performing the speed parameter update process and a motor rotation period at a high rotation speed, i.e., at the constant speed Msp_hi, may be extended. In such manner, the motor 10 will arrives at the target position, i.e., Cen*, at time x27. That is, the motor 10 will arrive at the target position at an earlier time than in instances where the speed parameter update process is not performed.

By performing a speed parameter update process, the deceleration torque of the motor 10 is used as much as possible, i.e., advantageously utilized, and the responsiveness of the motor 10 is improved as compared to instances where a speed parameter update is not performed.

As described above, the shift range controller 40 switches/changes the shift range by controlling the drive of the motor 10, and is provided with the target speed setter 63 and the requested duty calculator 69.

The target speed setter 63 sets the target motor speed Msp* of the motor 10 based on the angle deviation. The angle deviation is the difference between the current rotation position of the motor 10 and the target rotation position of the motor 10 based on the requested shift range.

The requested duty calculator 69 calculates the requested duty Dreq as the drive control amount for driving the motor 10 based on the target motor speed Msp*.

The requested duty Dreq is fed back to the target speed setter 63, and, based on the requested duty Dreq feedback, the target motor speed Msp* at the deceleration time is changed.

By changing the target motor speed Msp* based on the requested duty Dreq, the target motor speed Msp* is changed to accommodate current operating conditions, for example, to account for impediment causing conditions and external factors, such as temperature and friction. In such manner, the responsiveness of shifting through shift ranges is improved.

It is assumed that the requested duty Dreq is a value that takes a positive value in an acceleration time and takes a negative value in a deceleration time. The target speed setter 63 may interrupt the deceleration control when the requested duty Dreq at the deceleration control time is greater than the deceleration time target duty Dst, and set the deceleration to have a value (i.e., deceleration rate) greater than the value before the interruption, after resuming the deceleration control.

When the requested duty Dreq is greater than the deceleration time target duty Dst, the motor 10 have some margin to output additional deceleration torque. In such case, by delaying the deceleration timing and increasing the value of deceleration, the high speed rotation time of the motor 10 is extended, and the responsiveness of the control is improved.

The deceleration time target duty Dst may vary based on the count deviation ΔCen at the deceleration time. More practically, during the deceleration time, the deceleration time target duty Dst takes a higher negative value as the value of the count deviation ΔCen decreases. That is, as the detent roller 26 of the detent spring crests one of the teeth on the detent plate 21, the count deviation ΔCen continues to decrease and the deceleration time target duty Dst takes a negative value. The absolute value of the deceleration time target duty Dst takes a greater value as the count deviation ΔCen value decreases.

In such manner, the margin of deceleration capacity of the motor 10 can be calculated correctly.

Other Embodiments

In the previously-described embodiment, the motor is a permanent magnet-type, three-phase-circuit brushless motor. In other embodiments, the motor may be a motor other than the three-phase brushless motor, such as a switched reluctance (SR) motor or another type of motor. Even when a motor other than a brushless motor is used, the same effects as those described in the previous embodiment may be achieved. Though the motor in the previous embodiment is described as having two winding groups, the number of winding groups may be other than two, that is, the motor may have one winding group or three or more winding groups.

In the previously-described embodiment, the drive of the motor 10 may be controlled by a 120-degree power supply. In other embodiments, the drive control of the motor 10 may be performed by a control other than the 120-degree power supply. For example, a 180-degree power supply may be used to control the drive of the motor 10. A PWM control by a triangular wave comparison method or an instantaneous vector selection method may also be used to control the drive of the motor 10.

In the previously-described embodiment, an encoder is used as a rotational angle sensor for detecting the rotation angle of the motor. However, in other embodiments, a device other than the encoder, for example, a resolver, may be used as a detection device for detecting the rotation angle of the motor. Instead of using an encoder count value, other values that may be converted to a motor rotation angle may be used as a feedback value.

In the previously-described embodiment, four concave indentations 22 are provided on the detent plate 21. In other embodiments, the number of concave indentations may be other than four. For example, the detent plate may have two concave indentations for a switching between the P range and the NotP range. The shift range switching mechanism, the park lock mechanism, and other parts/devices may be further modified from those described in the previously-described embodiment.

In the previously-described embodiment, a speed reducer is disposed at a position between the motor shaft and the output shaft. The detailed structure of the speed reducer may be any structure such as a cycloid gear, a planetary gear, or a spur gear that transmits a torque from a substantially-concentric motor shaft to a drive shaft, as well as a combination of such gears. In other embodiments, the speed reduction mechanism between the motor shaft and the output shaft may be omitted, or a mechanism other than the speed reduction mechanism may be used.

Although the present disclosure has been described in connection with an embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A shift range controller configured to switch a shift range by controlling a drive of a motor, the shift range controller comprising:
   a target speed setter configured to set a target rotation speed of the motor based on an angle deviation between a current rotation position of the motor and a target rotation position of the motor based on a requested shift range; and
   an instruction calculator configured to calculate a drive control amount for driving the motor based on the target rotation speed, wherein
   when the target speed setter receives a feedback of the drive control amount during a deceleration time, the target speed setter is further configured to change the target rotation speed based on the feedback of the drive control amount; and
   the shift range controller further comprises a rotation speed calculator for calculating a rotation speed of the motor; wherein
   the target speed setter is further configured to
      set a deceleration start count value to indicate a beginning of the deceleration time,
      control a deceleration of the motor during the deceleration time, and
      determine a deceleration time target duty value based on an absolute value of the angle deviation for controlling the deceleration of the motor during the deceleration time, and wherein,
   after the beginning of the deceleration time, when the target speed setter determines that value of the drive control amount is greater than the deceleration time target duty value, the target speed setter is further configured to update the target rotation speed and interrupt the deceleration of the motor and to update the deceleration start count value based on a difference between the target rotation speed of the motor and the rotation speed of the motor.

2. The shift range controller of claim 1, wherein
when the angle of deviation is equal to the updated deceleration start count value, the target speed setter is further configured to resume the deceleration of the motor.

\* \* \* \* \*